United States Patent [19]

Hornberger

[11] Patent Number: 4,721,312

[45] Date of Patent: Jan. 26, 1988

[54] CASSETTE SEAL FOR A SHAFT

[75] Inventor: Jörg Hornberger, Schriesheim, Fed. Rep. of Germany

[73] Assignee: Firma Carl Freudenberg, Weinheim, Fed. Rep. of Germany

[21] Appl. No.: 820,936

[22] Filed: Jan. 21, 1986

[30] Foreign Application Priority Data

Feb. 16, 1985 [DE] Fed. Rep. of Germany ....... 3505464

[51] Int. Cl.⁴ .................. F16J 15/32; F16J 15/34; F16J 15/54
[52] U.S. Cl. ......................... 277/37; 277/38; 277/68; 277/95; 277/134; 277/153
[58] Field of Search .................. 277/152, 153, 37, 38, 277/134, 133, 68, 35, 39, 95, 207 R, 25

[56] References Cited

U.S. PATENT DOCUMENTS

| | | | |
|---|---|---|---|
| 2,292,920 | 8/1942 | Barrows | 277/133 |
| 2,350,448 | 6/1944 | Collins | 277/133 X |
| 3,021,161 | 2/1962 | Rhoads et al. | 277/37 |
| 3,086,781 | 4/1963 | Hudson et al. | 277/39 |
| 3,156,474 | 11/1964 | Nelson | 277/39 |
| 3,501,155 | 3/1970 | Dega et al. | 277/134 X |
| 3,510,138 | 5/1970 | Bowen et al. | 277/35 |
| 3,633,927 | 1/1972 | Van Deven | 277/134 |
| 3,667,767 | 6/1972 | Bakewell | 277/133 X |
| 3,682,488 | 8/1972 | Matsushima | 277/39 X |
| 4,428,586 | 1/1984 | Romero | 277/38 |
| 4,557,612 | 12/1985 | Neal | 277/68 |
| 4,563,012 | 1/1986 | Zimmermann et al. | 277/68 X |

FOREIGN PATENT DOCUMENTS 1034756 7/1966 United Kingdom .............. 277/153

Primary Examiner—Allan N. Shoap
Attorney, Agent, or Firm—Felfe & Lynch

[57] ABSTRACT

A cassette seal has a sealing ring and a resilient protective ring for forming a dust seal to protect the sealing ring from dust. For this, a lip on the protective ring axially engages a substantially-radial countersurface in the cassette seal to accommodate better relative axial movement between the lip and countersurface with the resilience of the protective ring. In addition, at least one channel-defining projection on at least one of the axially-opposite sides of the protective ring centrifugally assists the dust seal.

4 Claims, 3 Drawing Figures

CASSETTE SEAL FOR A SHAFT

BACKGROUND OF THE INVENTION

The invention relates to a cassette seal for a shaft.

A known cassette seal has a outer ring for mounting the cassette seal on a structure. A lipped sealing ring is sealingly affixed to an inward, annular projection of the outer ring for slidingly and sealingly engaging with a resilient bias about a radially-outside, axial surface of a protective sleeve. The protective sleeve is coaxially inside the outer ring for sealing about a shaft axially therethrough and rotation therewith relative to the outer ring. The protective sleeve has an outward, annular projection. A resilient protective ring, sealingly fixed to the outward projection of the protective sleeve, has a lip sealingly pressing against the inward projection of the outer ring to protect the sealing ring from foreign bodies, like dust, for example.

U.S. Pat. No. 3,682,488 describes such a cassette seal. The lip of its protective ring extends axially to contact a countersurface on the inward projection of the outer ring which extends radially. The effectiveness of this arrangement depends on precise association of the parts of the seal with one another. Complex adjusting work during assembly is, therefore, unavoidable.

Even this does little good, however, if relative displacement in the axial direction occurs between the lip of the protective ring and its countersurface during normal operation, or if wear occurs in this critical area. Both do.

Inasmuch as the protective ring is fixed to the protective sleeve which is fixed to the shaft and the countersurface for its lip is on the outer ring which mounts the cassette seal, axial displacement of the shaft in normal, rotational operation produces such relative axial displacement between the lip of the protective ring and its countersurface. Inasmuch as the lip of the protective ring slides on its countersurface when these relatively rotate with the shaft and outer ring, these always wear in time.

SUMMARY OF THE INVENTION

The object of the invention is, therefore, to improve a cassette seal of the kind described above such that the lip of the protective ring will be highly effective without adjusting work and substantially independent of any relative axial displacement of the shaft and protective sleeve relative to the mounting structure and outer ring of the cassette seal and/or of any wear of the lip of the protective ring in the cassette seal.

This and other objects are achieved by the invention in a cassette seal of the kind described above by having the lip of the protective ring on the projection of the protective sleeve and its countersurface on the projection of the outer ring extend substantially radially into axial engagement defining a substantially-radial seal zone therebetween. The countersurface is, therefore, an axial-defining surface portion of the outer-ring projection facing away from the sealed space. In addition, at least one of the axially-opposite sides of the projection of the protective sleeve is operatively connected, preferably via the protective ring, to at least one generally-axial projection and, preferably, plural protections distributed uniformly around its circumference for defining at least one channel and, preferably, plural channels which are open outwardly in the radial direction as well as axially in the direction of the projections.

The countersurface portion of the substantially-radial, axial-defining surface of the outer-ring projection that is contacted by the lip of protective ring preferably is radial and the lip of the protective ring preferably is a radial portion thereof to overlap the countersurface radially. This provides static and dynamic sealing advantages.

Precise relationship between the countersurface of the outer-ring projection and the lip of the protective ring and, therefore, between the outer ring and the protective sleeve is not required. Instead, it is sufficient if the forces necessary for assembling and/or installing the cassette seal press the lip of the resilient protective ring axially against the countersurface of the outer-ring projection. No special adjustment during or after assembly is necessary for this.

A resilient layer which, if desired, is integral with the resilient protective ring is preferably disposed between the protective sleeve and the surface of the sealed shaft. It results in some spring-back of the protective sleeve in the axial direction opposite to the pressing forces of installation when these diminish. This results in reducing the pressure between the outer-ring projection and the protective lip caused by the pressing forces. The resilient layer thus has a wear-reducing effect on the lip of the protective ring which is of great advantage, especially during the break-in time.

The projection of the protective sleeve is preferably of leak-proof configuration and held in a leakproof manner on the surface of the sealed shaft by the protective sleeve. When the resilient layer is integral with the protective ring, however, its primary function is as a carrier for the lip of the protective ring to aid such sliding engagement thereof with the countersurface of outer-ring projection as assures effective sealing thereagainst.

The sealing effect in this regard is decidely supported by the channels preferably disposed in operative association with at least one of the axially-opposite faces of the projection of the protective sleeve. The effect of these channels, which are open radially outwardly as well as axially and uniformly distributed around the particular face, depends on the face on which they are disposed but, on either face, is achieved centrifugally.

Channels on the side of the projection of the protective sleeve facing the sealed space, i.e. in the interstice between the projections of the protective sleeve and outer ring with its actual sealing lip, mainly drive any foreign bodies that have entered the interstice radially back out of the same. For this, the projections defining the channels are preferably axially broad enough to assure the radial action. The foreign bodies therefore cannot result in greater wear of the actual sealing lip.

Channels on the side of the projection of the protective sleeve facing oppositely, i.e. away from the sealed space, mainly drive away any foreign bodies striking the outside of the cassette seal. This can be done radially, utilizing the centrifugal forces caused by rotation of the shaft, or axially, utilizing a surface of the projections inclined, wedge-like, to the rotation. The projections defining these channels can be, therefore, axially shorter. The foreign bodies are, therefore, prevented from caking up in the area of the protective lip. The useful life of the protective lip is thus considerably improved.

The channels are best defined by blade-like projections. These should extend radially if the direction of rotation of the shaft changes. Such a configuration can be made especially economically. An involute configuration is also possible. It is recommended, especially, when the shaft always rotates in the same direction.

When the channel-defining projections have a profile inclined wedge-like to the direction of rotation, the preferred angle of incline ranges from about 45° to about 60°. This is especially effective in preventing caking of foreign bodies at the lip of the protective ring.

The channel-defining projections can be made of any desired material. They can best be formed of an elastomeric, integrally with the integral protective ring and resilient layer. This effectively prevents damage due to abrupt overloads. The protective ring then also operatively connects the projections thereon to the outward projection of the protective sleeve.

The channel-defining projections on the side of the protective ring facing away from the sealed space preferably run radially all the way thereacross to the protective lip area. This can increase the pressure of the lip of the protective ring against its countersurface on the outer-ring projection which is advantageous in avoiding penetration of foreign bodies into the interior of the cassette seal. This effect can be further increased if radial prolongations of the projections axially overlap the radial extremity of the protective ring. This also prevents foreign-body caking in the area directly adjacent the dynamic sealing zone of the lip of the protective and its countersurface to lengthen the useful life of the lip.

DESCRIPTION OF THE PREFERRED EMBODIMENT

Figure 1:
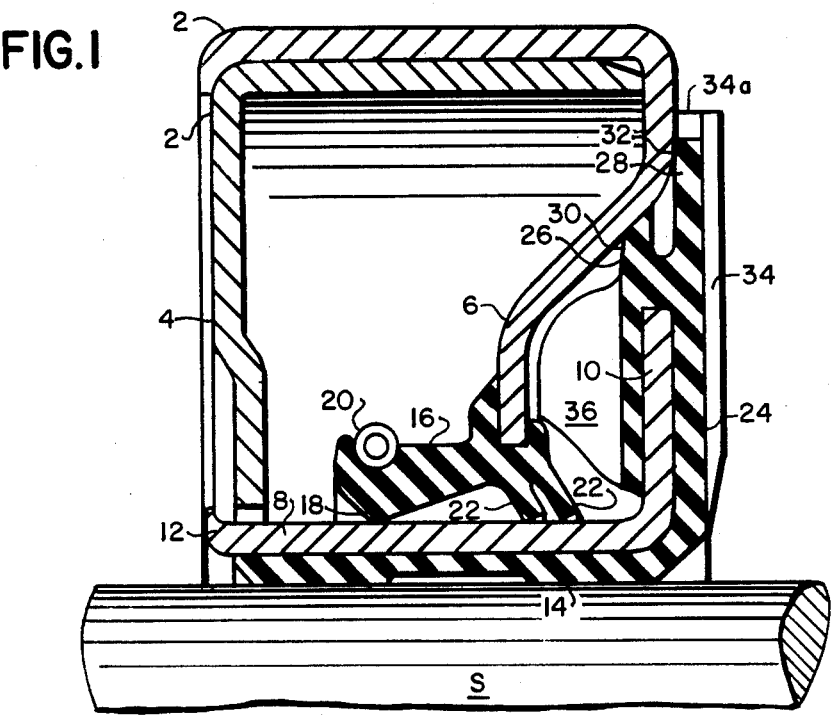
FIG. 1 is an axial cross sectional view of an exemplary preferred embodiment of a cassette seal according to the invention as installed for use on a shaft.

An exemplary, preferred embodiment of the present invention will now be described with reference to FIGS. 1–3 of the drawings. Identical elements on the various FIGS. are designated with the same reference numerals.

Figure 2:
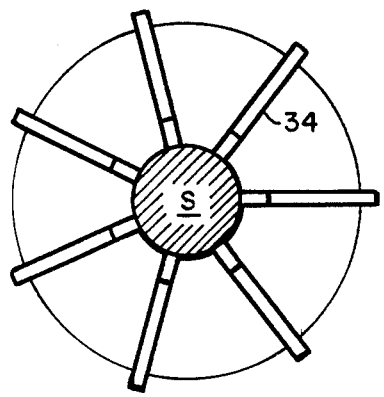
FIG. 2 is an end view of the shaft and seal of the FIG. 1, showing the projections 34 forming radial blades.
Figure 3:
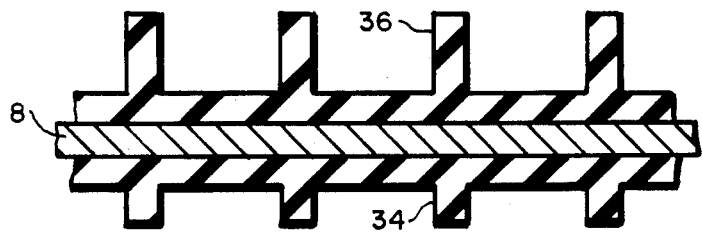
FIG. 3 is an expanded projection onto a rectangular coordinate system of a circular cross section of the protective sleeve of the cassette seal shown in FIG. 1 and further showing the projections extending from axially-opposed sides of the protective ring 24.

The cassette seal illustrated in FIGS. 1–3 is a self-contained unit which can be installed on or removed from shaft S only as a whole. For this, it has a generally U-shaped, two-part, composite outer ring 2 having inward projections 4, 6 on the axially-opposite sides thereof. An L-shaped protective sleeve 8 is rotatable inside the outer ring 2. An outward projection 10 of the L-shape at one end of the protective sleeve and a crimp 12 at the other end, radially overlap and axially straddle the inward projections 4, 6 of the outer ring to hold the cassette seal together as a unit.

In use, the outside of the outer ring of the cassette seal unit normally fits fixedly and sealingly into a bore of a casing structure (not shown). The protective sleeve is sealed about the surface of the shaft with a resilient layer 14 therebetween for rotation with the shaft relative to the outer ring and casing bore.

The inner end of the inward projection 6 of the outer ring 2 carries a sealing member 16 which extends axially between the inward projections of the outer ring and toward the sealed space. It is of rubber-elastic material to bias a sealing lip 18 on one axial end portion thereof radially against the outside of the protective sleeve 8. A spiral, garter spring 20 about the sealing member opposite the sealing lip aids this. The other axial end of the sealing member 16 has a pair of tandem-arranged dust lips 22. The dust lips also engage the protective sleeve under an elastic bias for sealing thereabout. They are primarily intended, however, for keeping foreign bodies, like dust, for example, from the sealing lip 18 to avoid wearing it therewith and consequent loss of seal and contamination of or leakage from the sealed space.

A protective ring 24 integrally extends from the resilient layer 14 along both axial sides of the inward projection 10 of the L-shaped protective sleeve. It has two, outermost, axially-spaced, generally-parallel lips 26,28 which are also intended to seal foreign bodies like dust out of the cassette seal.

For this, a first countersurface portion 30 of the inward projection 6 of the outer ring 2 extends inward of the U-shape of the cross section of the outer ring. The radially outermost end of the lip 26 of the protective sleeve which is axially inward of its other, outer lip 28 sealingly engages the first countersurface portion 30. Because of the inward orientation of the countersurface portion 30, however, relative axial movement of the projections 6,10 of the outer ring 2 and protective sleeve 8 tends to separate the lip 28 and its countersurface 30 even though the lip is resilient. Such axial movement is caused by corresponding relative axial movement between the casing (not shown) and shaft S to which the outer ring and protective sleeve are sealingly affixed as may be expected in normal use. The lip 26 is, therefore, not as effective a dust seal as could be desired.

The other lip 28 of the protective ring solves this problem. The inward orientation of the countersurface 30 on the inward projection 6 of the outer ring defines a circular, generally-radial, axial-defining countersurface 32 on the inward projection 6 of the outer ring outwardly of the countersurface 30. A corresponding, generally-radial, side surface of the lip 28 axially engages this to form a radial seal zone therebetween. Because of its radial orientation, the resilience of the lip 28 maintains this sealing engagement in spite of relative axial movement of the outer ring and casing and the protective sleeve and shaft if the outer ring and protective sleeve are merely pressed together sufficiently to bias the lip 28 against its countersurface 32 during assembly of the cassette seal or its installation on the casing and shaft.

In spite of this, however, prolonged attack on the relatively-rotatable lip 28 and its countersurface 32 by foreign bodies, like dust, for example, will eventually wear them to allow the foreign bodies into the cassette seal and, furthermore, even this seal is not perfectly impervious to small foreign bodies, like dust, for example, particularly if pronounced axial movement and/or caking of the foreign bodies at the lip 28 and countersurface 32 occurs. In other words, the effectiveness of the lips 22, 26 and 28 in keeping foreign bodies like dust away from the sealing lip 18 and the sealed space on the other side of the sealing lip 18 from the other lips 22, 26, and 28 could be improved if the foreign bodies never reached the lips 22, 26, and 28 and, if reaching and penetrating the axially-outermore of them, i.e. lip 26, 28, were driven back therethrough, out of the cassette seal.

For this, there are projections 34, 36 uniformly spaced about axially-opposite sides of the protective ring 24 and operatively connected thereby to the inward projection 10 of the protective sleeve. The projections 34, 36 define channels therebetween which are open outwardly (and inwardly) in the radial direction and axially in the direction of the projections. The relative rotation of the outer ring and protective sleeve operates the projections 34, 36 centrifugally and leads to centrifugal forces on foreign bodies in this area. This operation is most efficient when, as in the usual case described, the shaft and thus the projections rotate. Otherwise, the operation is dependent on rotationally entraining foreign bodies.

When foreign bodies, like dust, for example, enter into the axially outermore channels defined by the projections 34, the rotation centrifugally accelerates them out the radially-outwardly open end of the channels and, thus, away from the sealed lip 28 and countersurface 32 so that they cannot penetrate this seal. The circumferential edges of the projections 34 (one shown in the drawing) are also inclined, wedge-like to the rotation. If the foreign bodies in the channels between the projections 34 are impacted by the projections as they rotate, the foreign bodies are also driven axially away from the cassette seal and its sealed lip 28 and countersurface 32 so that, again, they cannot penetrate this seal. Both these actions also prevent the foreign bodies from caking on the cassette seal at its sealed lip 28 and countersurface 32, which caking could facilitate foreign-body penetration of the seal of the lip and countersurface.

The projections 34 also extend across the full radial extent of the protective ring 24 and, particularly, across the side of its lip 28 axially opposite the countersurface 32. This stiffens the lip 28 to aid its resilient engagement with the countersurface and, thus, their seal in the face of separating axial movement between the projections 6, 10 of the outer ring and protective sleeve.

The projections 34 are also radially prolonged to have a radially-outermost portion 34a axially across the radially-outermost end of the lip 28. The projection portions 34a centrifugally drive foreign bodies radially from the sealed, lip 28 and countersurface 32 and rotationally drive them tangentially therefrom upon impact to aid the seal and prevent caking as before described.

Because of the incline of the inward projection 6 of the outer ring for defining the radial countersurface 32 from the countersurface 30, the channel-defining projections 36 have to be radially innermore and shorter than the channel-defining projections 34 and, thus, centrifugally less effective. Further, they are not inclined to the rotation as this, due to their opposite-axial projection, would undesirably drive foreign bodies into the cassette seal and not away from it, as desired. As a result, the projections 36 are axially broader than the projections 34 to define deeper channels for increasing their centrifugal effectiveness. Any foreign bodies which do reach the channels defined by the projections 36 in spite of the lips 26, 28 are thus centrifugally driven back toward the lips 26, 28 to leave the cassette seal the way they got in. The radial component of the contact between each lip 26, 28 and its countersurface 30, 32 aids this, too.

It will be understood that the specification and examples are illustrative but not limitative of the present invention and that other embodiments within the spirit and scope of the invention will suggest themselves to those skilled in the art.

What is claimed is:

1. In a cassette seal having an outer ring for mounting the cassette seal on a structure, a first inward, annular projection of the outer ring, a protective sleeve coaxially inside the outer ring for sealing about a shaft axially therethrough and for rotation therewith relative to the outer ring, a lipped sealing ring sealingly affixed to the first inward, annular projection of the outer ring sealingly engaging with a resilient bias a radially outside surface of the protective sleeve, an outward, annular projection of the protective sleeve, and a resilient protective ring on the outward, annular projection of the protective sleeve having a lip sealingly pressing against the inward, annular projection of the outer ring for protecting the sealing ring from foreign bodies, the improvement comprising:

a substantially-radial, axial-defining countersurface on the inward, annular projection of the outer ring in axial engagement with a corresponding portion of the lip of the protective ring for a substantially-radial seal zone therebetween;

at least one, generally-axial, channel-defining projection operatively connected to at least one of axially-opposite sides of the outward, annular projection of the protective sleeve for defining at least one channel which is open outwardly in the radial direction and axially in the direction of the channel-defining projection; and a second inward, annular projection of said outer ring spaced axially from said first inward, annular projection, said outer ring forming a U-shaped cross-section defining a sealing space for a fluid, said sealing ring extending axially between said first and said second annular projections;

wherein the side of the outward, annular projection of the protective sleeve having the at least one, channel-defining projection is the axially outermore side thereof and the at least one, channel-defining projection extends radially across the lip of the protective ring; and wherein the at least one, channel-defining projection has a radial outermost portion which extends axially across the radially outermost end of the lip of the protective sleeve.

2. In a cassette seal having an outer ring for mounting the cassette seal on a structure, a first inward, annular projection of the outer ring, a protective sleeve coaxially inside the outer ring for sealing about a shaft axially therethrough and for rotation therewith relative to the outer ring, a lipped sealing ring sealingly affixed to the first inward, annular projection of the outer ring sealingly engaging with a resilient bias a radially outside surface of the protective sleeve, an outward, annular projection of the protective sleeve, and a resilient protective ring on the outward, annular projection of the protective sleeve having a lip sealingly pressing against the inward, annular projection of the outer ring for protecting the sealing ring from foreign bodies, the improvement comprising:

a substantially-radial, axial-defining countersurface on the inward, annular projection of the outer ring in axial engagement with a corresponding portion of the lip of the protective ring for a substantially-radial seal zone therebetween;

at least one, generally-axial, channel-defining projection operatively connected to at least one of axially-opposite sides of the outward, annular projection of the protective sleeve for defining at least one channel which is open outwardly in the radial direction and axially in the direction of the channel-defining projection; and a second inward, annular projection of said outer ring spaced axially from said first inward, annular projection, said outer ring forming a U-shaped cross-section defining a sealing space for a fluid, said sealing ring extending axially between said first and said second annular projections;

wherein the at least one channel-defining projection comprises blade-like projections uniformly distributed circumferentially about the at least one side of the outward, annular projection of the protective sleeve for defining channels therebetween; and wherein the at least one, channel-defining projection has a radial outermost portion which extends axially across the radially outermost end of the lip of the protective sleeve.

3. In a cassette seal having an outer ring for mounting the cassette seal on a structure, a first inward, annular projection of the outer ring, a protective sleeve coaxially inside the outer ring for sealing about a shaft axially therethrough and for rotation therewith relative to the outer ring, a lipped sealing ring sealingly affixed to the first inward, annular projection of the outer ring sealingly engaging with a resilient bias a radially outside surface of the protective sleeve, an outward, annular projection of the protective sleeve, and a resilient protective ring on the outward, annular projection of the protective sleeve having a lip sealingly pressing against the inward, annular projection of the outer ring for protecting the sealing ring from foreign bodies, the improvement comprising:

a substantially-radial, axial-defining countersurface on the inward, annular projection of the outer ring in axial engagement with a corresponding portion of the lip of the protective ring for a substantially-radial seal zone therebetween;

at least one, generally-axial, channel-defining projection operatively connected to at least one of axially-opposite sides of the outward, annular projection of the protective sleeve for defining at least one channel which is open outwardly in the radial direction and axially in the direction of the channel-defining projection; an a second inward, annular projection of said outer ring spaced axially from said first inward, annular projection, said outer ring forming a U-shaped cross-section defining a sealing space for a fluid, said sealing ring extending axially between said first and said second annular projections;

wherein the side of the outward, annular projection of the protective sleeve having the at least one, channel-defining projection is the axially outermore side thereof and at least one axial surface of the at least one channel-defining projection thereon is inclined, wedge-like, to the relative rotation between the outer ring and protective sleeve;

wherein the at least one, channel-defining projection has a radial outermost portion which extends axially across the radially outermost end of the lip of the protective sleeve.

4. In a cassette seal having an outer ring for mounting the cassette seal on a structure, a first inward, annular projection of the outer ring, a protective sleeve coaxially inside the outer ring for sealing about a shaft axially therethrough and for rotation therewith relative to the outer ring, a lipped sealing ring sealingly affixed to the first inward, annular projection of the outer ring sealingly engaging with a resilient bias a radially outside surface of the protective sleeve, an outward, annular projection of the protective sleeve, and a resilient protective ring on the outward, annular projection of the protective sleeve having a lip sealingly pressing against the inward, annular projection of the outer ring for protecting the sealing ring from foreign bodies, the improvement comprising:

a substantially-radial, axial-defining countersurface on the inward, annular projection of the outer ring in axial engagement with a corresponding portion of the lip of the protective ring for a substantially-radial seal zone therebetween;

at least one, generally-axial, channel-defining projection operatively connected to at least one of axially-opposite sides of the outward, annular projection of the protective sleeve for defining at least one channel which is open outwardly in the radial direction and axially in the direction of the channel-defining projection; and a second inward, annular projection of said outer ring spaced axially from said first inward, annular projection, said outer ring forming a U-shaped cross-section defining a sealing space for a fluid, said sealing ring extending axially between said first and said second annular projections;

wherein the at least one channel-defining projection comprises blade-like projections uniformly distributed circumferentially about the at least one side of the outward, annular projection of the protective sleeve for defining channels therebetween;

wherein the side of the outward, annular projection of the protective sleeve having the at least one, channel-defining projection is the axially outermore side thereof and at least one axial surface of the at least one channel-defining projection thereon is inclined, wedge-like, to the relative rotation between the outer ring and protective sleeve;

wherein the protective ring is integral with the at least one channel-defining projection for operatively connecting the at least one channel-defining projection to the outward, annular projection of the protective sleeve;

wherein the side of the outward, annular projection of the protective sleeve having the at least one, channel-defining projection is the axially outermore side thereof and the at least one, channel-defining projection extends radially across the lip of the protective ring;

wherein the at least one, channel-defining projection has a radial outermost portion which extends axially across the radially outermost end of the lip of the protective sleeve.

* * * * *